May 26, 1925.
G. E. SAVAGE
ELECTRIC WAFFLE IRON
Filed Oct. 25, 1924
1,539,276
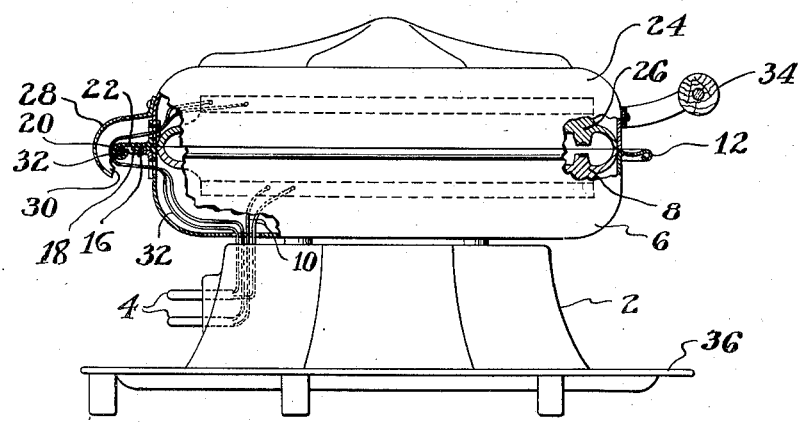
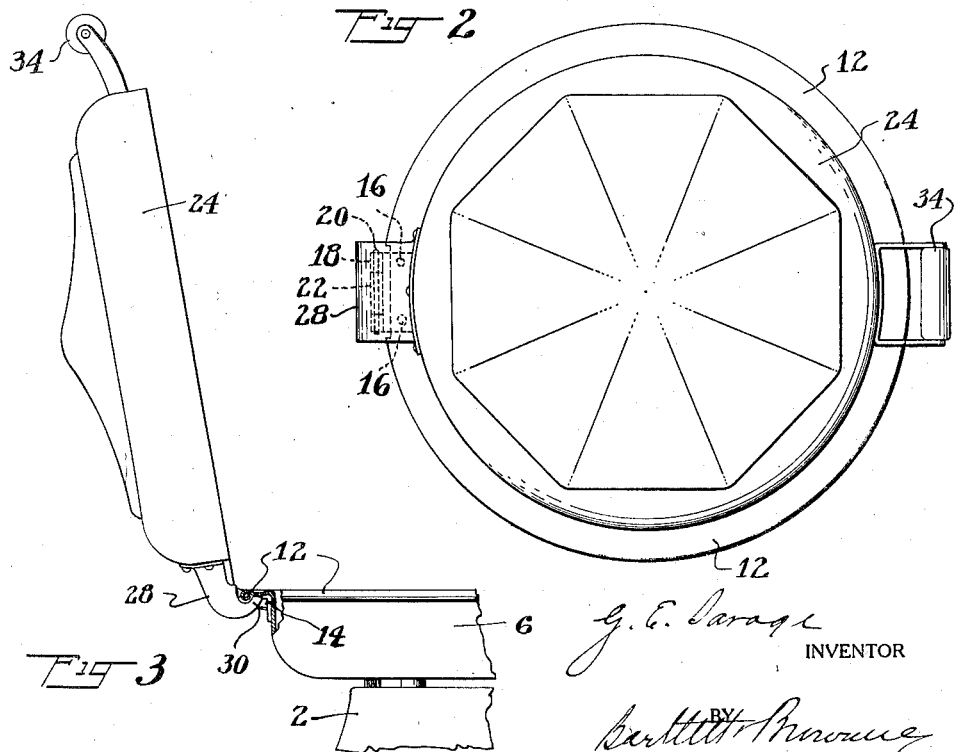

Patented May 26, 1925.

1,539,276

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

ELECTRIC WAFFLE IRON.

Application filed October 25, 1924. Serial No. 745,758.

*To all whom it may concern:*

Be it known that I, GEORGE E. SAVAGE, a citizen of the United States, residing at Meriden, county of New Haven, State of Connecticut, have invented certain new and useful Improvements in Electric Waffle Irons, of which the following is a full, clear, and exact description.

My invention relates to electric waffle irons and has for its object to provide means for reducing the danger of spilling the batter when the waffle iron is in use, and also to provide a new and improved means of connecting the stationary and movable members mechanically and electrically, for limiting the movement of the movable member, and for steadying it when in raised position. The following is a description of an embodiment of my invention, reference being had to the accompanying drawings, in which—

Fig. 1 shows a side elevation of a waffle iron, embodying my invention, parts being broken away;

Fig. 2 is a plan view of the waffle iron; and

Fig. 3 is a side elevation of a portion showing the waffle iron with the upper portion in raised position.

Referring more particularly to the drawings, 2 is the supporting base of an electric waffle iron carrying the ordinary plug terminals 4 adapted to connect the heating elements of the two grids of the iron with a heater cord leading from a lighting circuit. To this base is secured a casing 6 in which is mounted the lower grid 8 of the waffle iron connected to the terminals 4 in the ordinary way by conductors 10. At the upper edge of the lower grid casing 6, and preferably integral therewith, is a circular flange 12 substantially in the plane of the upper surface of the lower grid 8, which flange extends outward from the casing. Where the flange is integral with the casing instead of with the lower grid, the fit of the grid is so close as to prevent batter from passing between the flange and the grid. This flange 12, whether integral with the casing or grid, acts to prevent any excess of batter poured upon the lower grid 8 from spilling over on to the base or the table upon which it is used.

Secured to the receptacle and to the rear portion of the flange 12 by rivets 14 and 16 is one member of a leaf hinge. Loosely connected to this leaf hinge member by a pivot pin 20 is another leaf hinge member 22 which is secured to a casing 24, which casing contains the upper grid 26 of the waffle iron. Connected to this casing 24 is a cover 28 which conceals the hinge, being spaced away therefrom and being provided with projections 30 which, when the upper member is in raised position, engage the lower surface of the flange 12 and act as stop members to hold the casing 24 with the upper grid in a position slightly beyond the vertical when the casing is raised as shown in Fig. 3. Within the cover of the hinge and concealed thereby are conductors 32 which pass out of the lower casing and into the upper casing and are there connected with the heating element of the upper grid 26. The lower ends within the container for the support are connected to the inner ends of the plug terminals 4 so as to establish electrical connection between the heating element of the upper grid and said plugs. The plugs 4 are also electrically connected to the heating element of the lower grid 8, the connections of the grids with the plugs being preferably in multiple.

The flange 12 above referred to therefore performs the double function of preventing the excess batter from spilling and coming in contact with the lower casing and of cooperating with the stop members 30 upon the hinge cover 28 for the positioning of the upper member in raised position as above referred to. Said flange also provides a convenient and strong support for attachment of one leaf of said hinge which calls for strength on account of the weight and operating positions of the parts. 34 is a handle connected to the upper casing for raising and lowering the upper member.

The stop shoulders 30 being spaced apart on opposite sides of the hinge act to steady the movable member when they engage the flange with the movable member in raised position. The conductors 32 pass through holes in the upper and lower casings and between the pintle of the hinge and the cover 28. The lower edge of the cover has a notch through which the conductors pass when the upper grid is raised.

In order to afford greater protection against the spilling of the batter, the support is provided with a second flange 36 of greater diameter than said flange 12.

As will be evident to those skilled in the art, my invention permits of various modifications without departing from the spirit thereof or the scope of the appended claims.

What I claim is:

1. In an electric waffle iron, the combination of upper and lower grids, casings for said grids, a hinge pivotally connecting the two grids together, and a flange surrounding the lower grid, said flange being fixed in substantially the plane of the upper surface of said lower grid and projecting horizontally beyond both of said casings.

2. In an electric waffle iron, the combination of upper and lower grids, casings for said grids, a hinge pivotally connecting the two grids together, and a flange surrounding the lower grid, said flange being fixed in substantially the plane of the upper surface of said lower grid and projecting horizontally beyond both of said casings, the lower leaf of the hinge being connected to and supported by said flange.

3. In an electric waffle iron, the combination of upper and lower grids, casings for said grids, a hinge pivotally connecting the two grids together, a flange surrounding the lower grid substantially in the plane of the upper surface thereof, and a hinge cover connected to the upper casing and extending below the pivot of said hinge, said cover having stop surfaces adapted to engage the lower surface of said flange when said upper grid is in elevated position so as to limit its movement and hold it in approximately vertical position.

4. In an electric waffle iron, the combination of upper and lower grids, casings for said grids, a support for said lower casing, terminals carried thereby, a hinge pivotally connecting the two grids together, a flange supported by said casing surrounding the lower grid and substantially in the plane of the upper surface thereof, a hinge cover connected to said upper casing and extending below the pivot of said hinge, said cover having stop surfaces adapted to engage said flange when said upper casing is in elevated position so as to limit its movement and hold it in approximately vertical position, and conductors passing to the rear of said hinge and beneath said cover and connecting the heating element of the upper grid with the terminals carried by the stationary portion.

5. In an electric waffle iron, the combination of upper and lower grids, casings therefor, a hinge for pivotally connecting the two grids together, and a flange surrounding the lower grid and fixed substantially in the plane of the upper surface thereof, and a support for the lower casing, said support having a flange surrounding the same and projecting further than said first named flange.

GEORGE E. SAVAGE.